(12) United States Patent
Abrahams

(10) Patent No.: US 7,360,673 B2
(45) Date of Patent: Apr. 22, 2008

(54) NEVER DRIP SPOUT AND NEVER DRIP SPOUT WITH STRAINER

(76) Inventor: Paul Abrahams, 30 Scodon Dr., Ridgefield, CT (US) 06877

(*) Notice: Subject to any disclaimer, the term of this patent is extended or adjusted under 35 U.S.C. 154(b) by 577 days.

(21) Appl. No.: 10/771,646

(22) Filed: Feb. 4, 2004

(65) Prior Publication Data

US 2005/0178805 A1    Aug. 18, 2005

(51) Int. Cl.
  B65D 25/00    (2006.01)
  B65D 25/04    (2006.01)
  B65D 23/012    (2006.01)
(52) U.S. Cl. ............... 222/571; 222/570; 222/189.07; 220/571.1; 220/701; 220/733
(58) Field of Classification Search ............... 222/570, 222/571, 574, 189.07, 109; 210/466, 468; 215/390; 220/570, 571, 571.1, 695, 697–701, 220/733, 735, 736
See application file for complete search history.

(56) References Cited

U.S. PATENT DOCUMENTS

| | | | |
|---|---|---|---|
| 2,106,381 A | | 1/1938 | Rough |
| 2,471,189 A | | 5/1949 | Bartels |
| 2,573,378 A | * | 10/1951 | Zurlinden .................. 215/235 |
| 2,604,232 A | | 7/1952 | Ruhlin |
| 2,606,694 A | * | 8/1952 | Galletta .................. 222/189.07 |
| 2,765,966 A | * | 10/1956 | Davis .................. 222/570 |
| 2,812,886 A | * | 11/1957 | Weinstein .................. 222/569 |
| 3,074,604 A | | 1/1963 | Baroud |
| 3,102,667 A | * | 9/1963 | Ullevig .................. 222/569 |
| 3,463,366 A | * | 8/1969 | Spencer .................. 222/570 |
| 4,009,802 A | * | 3/1977 | Hayduchok .................. 222/108 |
| 4,240,568 A | | 12/1980 | Pool |
| 5,078,872 A | | 1/1992 | Durant et al. |
| 5,169,040 A | | 12/1992 | Wiley |
| 5,172,822 A | * | 12/1992 | DeFrance .................. 220/733 |
| 5,195,662 A | | 3/1993 | Neff |
| 5,467,896 A | | 11/1995 | Hols |
| 5,579,963 A | | 12/1996 | Murthi |
| 5,597,090 A | | 1/1997 | Leahy |
| D382,801 S | * | 8/1997 | Samson .................. D9/435 |
| 5,685,464 A | | 11/1997 | Krueger |
| 6,457,590 B1 | | 10/2002 | Sheridan |

* cited by examiner

Primary Examiner—Kevin Shaver
Assistant Examiner—Melvin Cartagena

(57) ABSTRACT

A flexible, resilient molded elastomer pour spout device attachable to the rim of a bowl, can, pot, pan or other vessel, eliminates drips and spills by directing poured liquid over a protruding spout rather than over the vessel rim. A second version provides an integral strainer separating the poured liquid from solids to be kept in the vessel and not poured out.

9 Claims, 4 Drawing Sheets

Never Drip Spout

Never Drip Spout with Strainer

Never Drip Spout with Strainer (no holes)

NEVER DRIP SPOUT AND NEVER DRIP SPOUT WITH STRAINER

FIELD OF THE INVENTION

A device that attaches to a bowl, pot, pan or other type of vessel, such as the kind used in cooking, but not limited to cooking vessels, is designed to eliminate drips and spills when pouring liquids from the vessel or container, by directing the flow of liquids over a spout, rather than over the rim of the container, thereby making the container or vessel itself a pouring device. This is achieved by creating a spout protruding over the side of the vessel by means of sliding the said device over the rim edge of the vessel. In addition a second version of the device provides a strainer which is integrated in the design of said spout such that solids, which need to remain in the vessel, may be separated from the liquids that are being poured out of the vessel.

The molded elastomer device is flexible in design and can adapt to various sizes and shapes of bowls, pots, pans or other types of vessels and attaches to the vessel by sliding it over the rim of a vessel. The gripping effect of the device is created by the gap between the outer flange or panel portion (the side that is in contact with the outside of the vessel), and the inner flange or panel portion (the side that is in contact with the inside of the vessel). This gap is sufficiently wide and flexible to fit over the rim of the vessel but is narrow enough to make a tight connection to vessels of varying rim widths and shapes. The horizontal channel at the top portion of the gap is wider and designed to accommodate various rim designs. Being fabricated of molded elastomer, the device is sufficiently flexible horizontally and structurally so that it can conform to a variety of vessel diameters. The present invention relates to cooking because it permits the pouring of liquids from pots, pans or bowls, but is not limited to cooking because it can be used for practically any type of bowl or container thereby turning it into a pouring vessel.

BACKGROUND OF THE INVENTION

Present problems that this invention remedies:

When pouring liquids of various viscosities from a vessel, it is common for some of that liquid to drip over the rim of the vessel such that the outside of the vessel itself, and/or the surface upon which the vessel is then placed, may become soiled. By using the Never Drip and Never Drip with Strainer (with and without holes) spout accessory, drips and soiling can be eliminated. In addition, during the act of pouring, it is sometimes necessary to separate and drain liquids from solids. By using the Never Drip Strainer accessory, one may pour and strain without soiling a vessel or surface upon which the vessel is then placed.

PRIOR PATENTS

U.S. Pat. No. 2,106,381 January, 1938 Rough

Although stated as not necessarily specific to paint cans, this pouring spout is stated to be "especially" useful for connecting to a paint can, or containers with removable lids such as paint cans. This device is designed to fit within the channels of a paint can, and will not fit properly, or seal tightly to other vessel types. In contrast the Never Drip accessory may be used with a variety of vessel types. The design of the Never Drip features an inner channel to direct the flow of liquid to a spout-protrusion on the outer rim of a vessel. Conversely the paint can spout promotes a concave plate in the shape of a visor to constitute the pouring spout and contains no strainer.

U.S. Pat. No. 2,471,189 May, 1949 Bartels

This device is stated as being applied especially for use with paint cans to facilitate pouring and straining. This device is designed to fit around the entire circumference of a paint can and is therefore restricted to the diameter of the container. As with the prior Rough invention, this device is designed to fit within the channels of a container with a specific rim and lid design, and will provide neither a proper fit, nor a tight seal to any other type of vessel.

The Never Drip may be applied to a wide variety of vessels for use in, but not limited to, cooking, crafts, or laboratory use.

U.S. Pat. No. 2,604,232 July, 1952 Ruhlin

This device has a lid design that fits over a large portion of a vessel, and features a gasket to seal the lid onto a container and a spout to facilitate pouring of liquids. The spout is similar to that of a teapot in that it is a closed funnel. This device does not provide a strainer. Conversely the Never Drip is a small and portable apparatus that is flexible such that it can accommodate a variety of vessel diameters. The Never Drip is attached by sliding over the rim edge of a vessel and has an open spout that channels liquid over it.

U.S. Pat. No. 3,074,604 January, 1963 Baroud

This device is stated as being designed especially for use with conventional paint cans to facilitate pouring but does not contain a strainer. This device is designed to fit within the channels of a paint can rim, and will not fit properly, or seal tightly to other vessel types. In contrast the Never Drip accessory may be used with a variety of vessel types, and may be used for, but not limited to, cooking, crafts, or laboratory use.

U.S. Pat. No. 4,240,568 December, 1993 Pool

This invention relates to containers having a brim and gutter rim, such as found in conventional paint cans. It is designed to fit specifically within the channels of the lid, and is designed to encompass the entire circumference of the container and will not accommodate a variety of vessel sizes and shapes. While it is designed to retard spillage, it provides the additional functionality of removing excess liquid from a paint brush. The Never Drip may be applied to a wide variety of vessels for use in, but not limited to, cooking, crafts, or laboratory use and does not have a specific use for removing excess paint from paint brushes.

U.S. Pat. No. 5,169,040 December 1992 Wiley

The patent adds a spout with a channel to a pre-existing spout as a means of directing liquid flow so as to eliminate drips, and contains no strainer. The Never Drip is a device designed to fit specifically over the rim of a vessel and not within the channel of a pre-existing spout.

U.S. Pat. No. 5,195,662 March, 1992 Neff

This device is stated as being designed especially for use with conventional paint, stain or varnish type cans to facilitate pouring. This device is designed to fit within the channels of a paint can, and will not fit properly, or seal tightly to other vessel types, and does not contain a strainer. The Never Drip may be applied to a wide variety of vessels for use in, but not limited to, cooking, crafts, or laboratory use.

SUMMARY OF THE INVENTION

The Never Drip and Never Drip with Strainer devices solve the problem of liquids dripping down the side of the vessel during or after pouring by creating a drip-resistant spout protruding over the outside of the vessel. Once attached, the Never Drip device helps to eliminate drips, or soiling the outside of the vessel when pouring. Also, the device has a strainer attached such that during pouring, solids that are required to remain within the vessel may be separated from the liquids being poured from the vessel. In addition, the strainer may also be used to separate fluids having different specific gravities that settle differently, such as occurs with oil and water.

The Never Drip device is composed of a flexible heat-resistant material that will not deform or be damaged when in contact with a vessel that is heated such as during cooking, nor will extreme cold temperatures affect the function of this accessory. This flexible material provides resilient traction, such that the combination of the tight grip on the vessel rim embraced in the gap between the inner and outer flange surfaces, and the resilient traction of the material, reduces the likelihood of the Never Drip device sliding off during use.

The combination of the tight grip and the resilient, flexible material creates a seal on the inner surface of the Never Drip device, thereby reducing the likelihood of liquid seeping between the inner grip flange of the attachment, and the rim of the vessel.

A principal object of the invention is achieved by its design, which channels liquids from the vessel over the protruding spout rather than simply over the rim of the vessel, which would otherwise be a wide and messy pouring area. The protruding spout is also designed to eliminate drips during or after pouring from the vessel. Thus by using the attachment one can eliminate soiling the outside of the vessel, tabletop, counter or stove surface while or after liquids have been poured from the vessel.

Another object is that the device attaches with minimal effort to any vessel and is flexible enough to adapt to a variety of vessel designs. Also, by being composed of a heat resistant material, it may be attached to a vessel before, during or after the vessel is heated. The Never Drip device can be easily cleaned using conventional cleaning methods including a standard dishwasher or a simple soap and water rinse.

A further object is that The Never Drip device is a versatile accessory and can be used for a multitude of functions including cooking, arts and crafts, laboratory use, or any activity where a vessel is being used with liquid that requires pouring, and which has a rim that can accommodate the Never Drip device.

Still another object of the invention is that The Never Drip device is flexible in design and can adapt to various sizes and shapes of bowls, pots, pans or other types of vessels. The Never Drip device is attached to the vessel by sliding it over the rim of a vessel. The gripping effect of the Never Drip device is created by the vessel rim-embracing gap between the outer flange (the edge that is in contact with the outside of the vessel), and the inner flange (the edge that is in contact with the inside of the vessel). This gap is sufficiently wide and flexible to fit over the rim of the vessel but is narrow enough to make a tight connection to vessels of varying rim widths and shapes. In addition the device is sufficiently flexible horizontally so that it can conform to a variety of vessel diameters. In addition, by using the Never Drip with Strainer accessory, one may pour as well as strain liquids from a vessel without soiling the vessel or surface upon which the vessel is then placed.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be made to the following detailed description taken in connection with the accompanying drawings, in which:

BRIEF DESCRIPTION OF THE DRAWINGS

Never Drip Spout

Never Drip Strainer Spout

Figure 7:
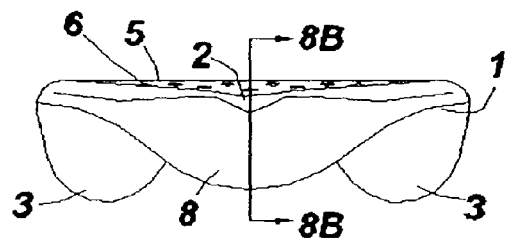

FIG. 7 is the front view of a second embodiment of the invention with the protruding strainer spout extending towards the viewer.

Figure 8C:
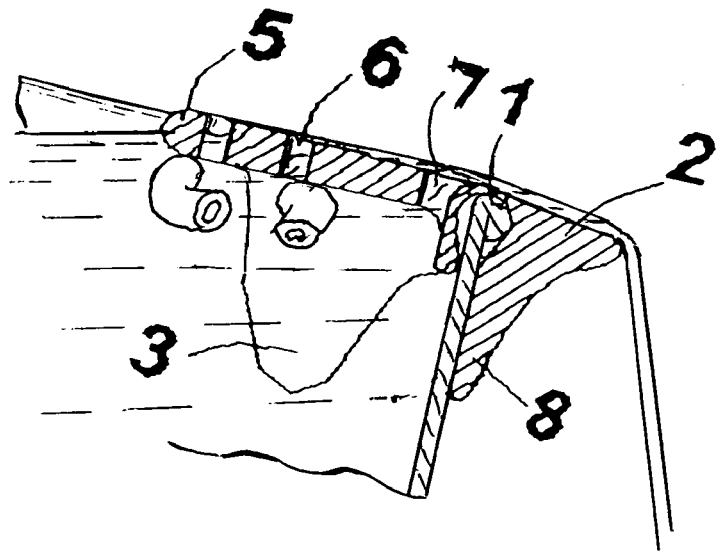
Figures 8A, 8B:
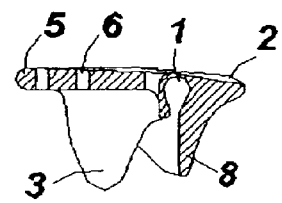

FIG. 8A is the side view of this second Never Drip Strainer embodiment showing the front protrusion of the spout, the rear flange grip, and the extension of the strainer on the horizontal plane.

FIG. 8B is a Sectional side view, taken on the plane 8B in FIG. 7, showing the shape of the gap or slot that fits over the vessel's rim, the spout opening, the straining holes and the cross-section of the strainer.

FIG. 8C is an enlarged fragmentary side sectional view showing this strainer embodiment tilted, pouring liquid over its protruding spout while retaining entrained solids behind its strainer.

Figure 9:
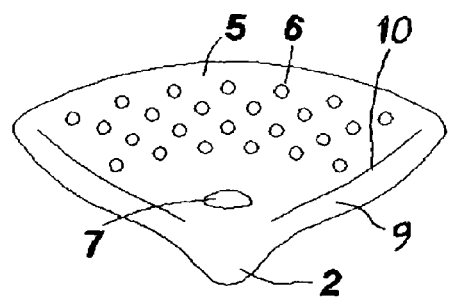

FIG. 9 is the top view showing the front curvature on the horizontal plane and the strainer with straining holes and front opening.

Figure 10:
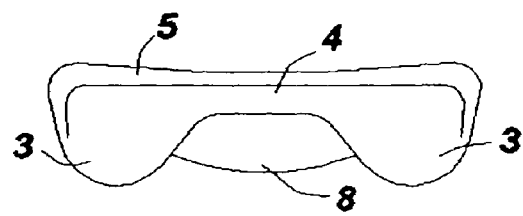

FIG. 10 is the rear view of this embodiment of the invention showing the back side of the spout and the two bulbous protrusions that act as flange grips to engage the inside of the bowl or vessel, the channel that guides the liquid over the spout, and the back edge of the strainer.

Figure 11:
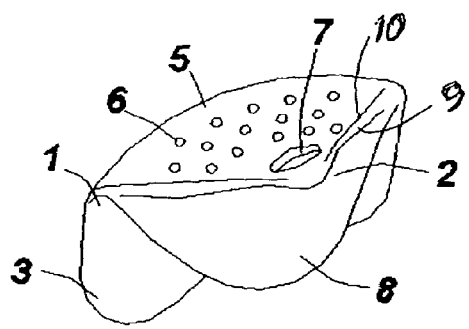

FIG. 11 is a front side isometric view of this second embodiment.

Figure 12:
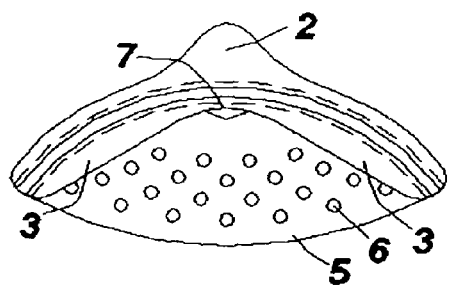

FIG. 12 is the bottom view showing the front curvature on the horizontal plane, the strainer with straining holes and opening, and the gap or slot that fits over the vessel's rim as seen from the bottom.

Never Drip Strainer Spout (No Holes)

Figure 13:
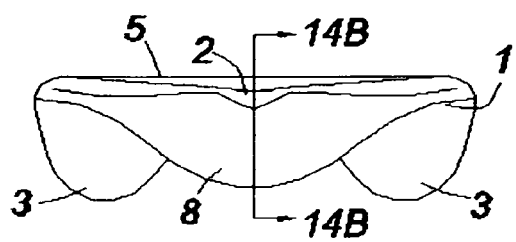

FIG. 13 is the front view of a simpler form of the second embodiment of the invention with the protruding spout with one opening extending towards the viewer.

Figure 14C:
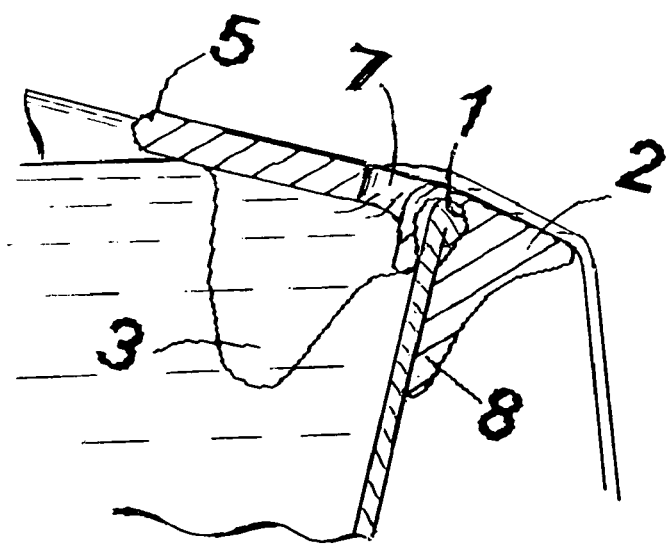
Figures 14A, 14B:
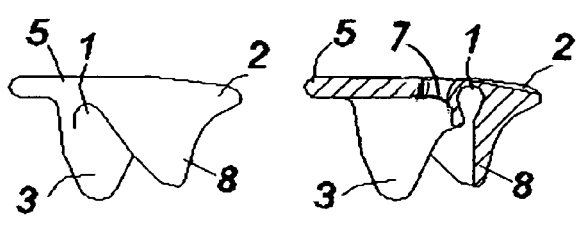

FIG. 14A is the side view of the same device showing the front protrusion of the spout, the rear grip, and the extension of the strainer with no holes on the horizontal plane.

FIG. 14B is a Sectional side-view, taken from the plane 14B in FIG. 13, showing the shape of the gap or slot that fits over the vessel's rim, the one spout opening, and the cross-section of the strainer.

FIG. 14C is an enlarged fragmentary side sectional view showing this embodiment tilted, pouring liquid over its protruding spout.

Figure 15:
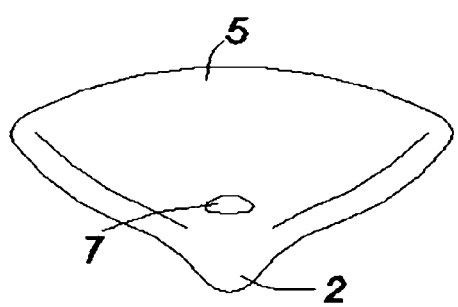

FIG. 15 is the top view showing the front curvature on the horizontal plane, the strainer and single front opening.

Figure 16:
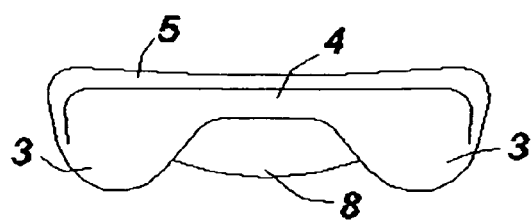

FIG. 16 is the rear view of the same device showing the backside of the spout and the two bulbous protrusions that act as flange grips to engage the inside of the bowl or vessel, the channel that guides the liquid over the spout, and the back edge of the strainer.

Figure 17:
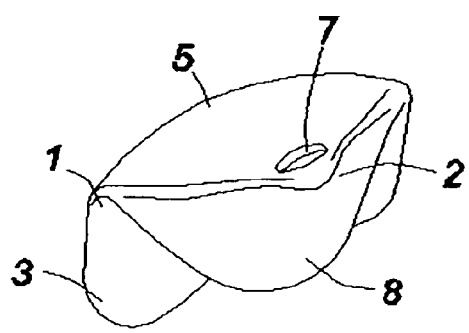

FIG. 17 is a front-side isometric view of this device, and

Figure 18:
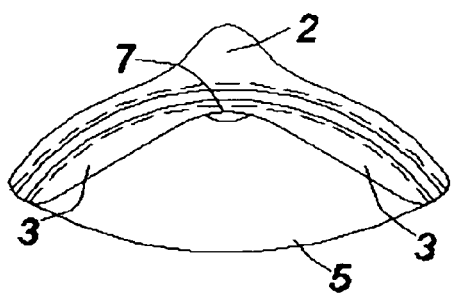

FIG. 18 is the bottom view showing the front curvature on the horizontal plane, the strainer and single opening, and the gap or slot that fits over the vessel's rim as seen from the bottom.

DETAILED DESCRIPTION OF THE INVENTION

The Never-Drip device is a flexible accessory that can adapt to various sizes and shapes of bowls, pots, pans or other types of vessels by sliding it over the rim of a vessel by means of a slot 1, that divides the front or outside panel flange portion 8 extending downward below a spout 2, from the back or inner panel or flange portion where there are two bulbous lateral terminal rear flange grips 3. The gripping effect of the accessory is created by the slot 1 that separates the front panel or flange 8 where the spout 2 is located (the side that is in contact with the outside of the vessel), and the inner flange grips 3 (the side that is in contact with the inside of the vessel). The gap of this slot 1 is sufficiently wide and flexible to fit over the rim of the vessel but is narrow enough to make a snug connection to vessels of varying rim widths. In addition, the slot 1 has a wider channel at the top to accommodate the diverse variety of rim shapes.

The outer front flange portion 8 of the device has an upper protrusion that extends the full width of the attachment, culminating in a shallow central spout 2, which is located on center and in the upper front portion of the device. The inner part of the device is comprised of two bulging rear flange grips 3, on the left and right side of the inner flange, connected by a web 4.

In the embodiment shown in FIGS. 7-12, a strainer 5 with straining holes 6 is connected to the upper portion of the back section of the device. The purpose of the strainer is to hold back larger entrained solid particles while the strainer holes 6 and a front central strainer opening 7 permit liquid to pass over the spout 2.

The embodiment shown in FIGS. 13-18 is similar, but its strainer 5 is provided only with a functional opening 7 where liquid wells upward to be poured over spout 2. In this embodiment, used for pouring liquids with no entrained solids, the small strainer holes 6 are not needed.

FIGS. 13 and 16 illustrate the upper surface of strainer panel 5 as being substantially flat in a plane substantially parallel to the plane defined by the upper vessel rim embraced in slot 1. If desired, the upper surface of strainer 5 may be very mildly dished in a concave shape as indicated in FIG. 13, and also in FIG. 7, where the holes 6 are seen in this front view between spout 2 and the rear edge of strainer 5.

FIGS. 9, 11, 15 and 17 indicate that slightly raised front ridges 9 may be formed along the upper front rim of the accessory along the junction of strainer panel 5 and the depending outer front flange panel 8, interrupted only by the shallow central spout 2. These same FIGURES indicate that an extremely shallow groove 10 may be formed directly behind front edge 9, serving to direct poured liquid on the upper surface of strainer 5 toward the central pour spout 2.

Figure 1:
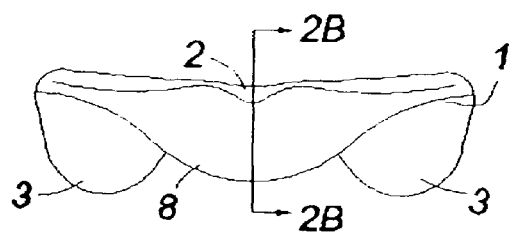
FIG. 1 is the front view of a first embodiment the invention with the protruding spout extending towards the viewer.
Figure 2A:
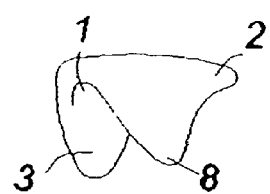
FIG. 2A is the side view of the same Never Drip Spout showing the front protrusion of the spout and the rear flange grips.
Figure 2B:
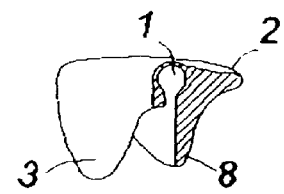
FIG. 2B is a Sectional side view, taken on the plane 2B in FIG. 1, showing the shape of the gap or slot that fits over the vessels rim.
Figure 5:
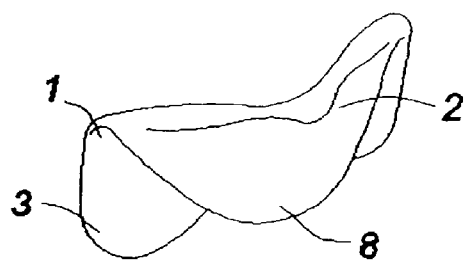
FIG. 5 is a side isometric view of the same device.
Figure 3:
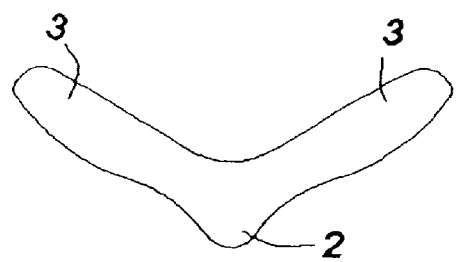
FIG. 3 is the top view showing the curvature on the horizontal plane.
Figure 6:
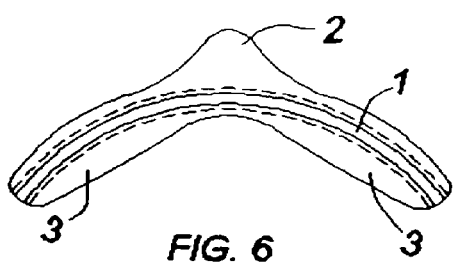
FIG. 6 is the bottom view showing the curvature on the bottom horizontal plane, and the gap or slot that fits over the vessel as seen from the bottom.
Figure 4:
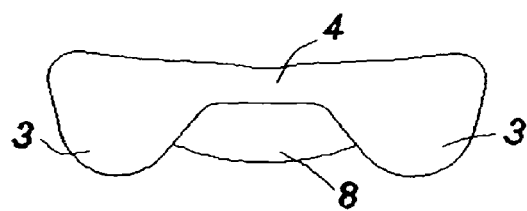
FIG. 4 is the rear view of same device showing the backside of the spout and the two bulbous protrusions that act as flange grips to engage the inside of the bowl or vessel and the channel that guides the liquid.
Figure 2C:
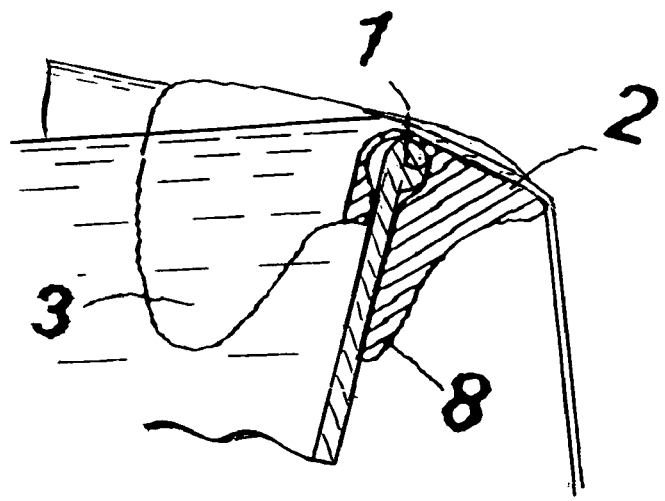
FIG. 2C is an enlarged fragmentary side sectional view showing this embodiment tilted, pouring liquid over its protruding spout.

The shape of the slot 1 designed to embrace the upper rim of the vessel receiving this device is shown as a sector of a circle in the bottom views of FIGS. 6, 12 and 18, and its slightly enlarged uppermost portion is shown by dashed lines in these views. The radius of curvature of this circular sector is preferably selected to fall within the range of average radii of curvature of the vessel rims of bowls, pots and pans used in most home kitchens, which might be a range of from three to six inches, for example. The elastic flexibility and resilience of the molded elastomers from which these accessories are molded will permit them to be bent or flexibly stretched to accommodate vessel rims within such a range of radii. The width of slot 1 is preferably selected in the same manner to accommodate standard rim thicknesses, and accessories having different slot widths may be molded to accommodate ceramic bowls, plastic bowls, or metal saucepans or cooking pots. It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A molded elastomer pour spout device comprising:
an outer front flange panel having an upper region,
an inner rear flange panel having an upper region, and
an upper sector rim integrally joined to said front flange panel's upper region and to said rear flange panel's upper region while maintaining a predetermined distance and thereby forming a sector slot of predetermined width between said flange panels,
said sector slot having its uppermost region bridged by said upper sector rim integrally joining the upper regions of said flange panels, leaving all other peripheral regions of said sector slot open,
a shallow central spout protruding forward from said upper rim beyond said front flange panel,
the upper rim and both flange panels being formed with a convexly curved shape, with both flange panels having radii of curvature about an axis perpendicular to the upper plane defined by the upper sector rim in said convexly curved shape, while maintaining said predetermined sector slot width, whereby said molded elastomer pour spout device is removably attachable to a sector of the rim of a liquid container vessel having a circular open upper vessel rim by lowering the elastomer pour spout's sector slot into sliding tractive telescoping engagement with said open upper vessel rim until said open upper vessel rim is substantially seated in contact with the uppermost region of said sector slot, where it is held by the flanges forming the slot being flexibly distorted to match the flanges, radii of curvature to those of the liquid container's open upper vessel rim, in cooperation with the tractive seated engagement of the outer flange and the inner flange resiliently telescoped over said open upper vessel rim, wherein said inner rear flange panel has a lower edge extending downward, with its lowest terminal lateral edge portions laterally spaced apart, leaving a higher central web portion between them.

2. The molded elastomer pour spout device defined in claim 1, wherein said front flange panel has a lower edge extending downward, with its lowest portion being centrally located below said shallow central protruding spout.

3. The molded elastomer pour spout device defined in claim 1, wherein said two lowest edge portions of said inner rear flange panel are thicker than the average thickness of said inner rear flange panel, forming two spaced-apart bulbous lobes in tractive engagement with the inner surface of the container vessel.

4. The molded elastomer pour spout device defined in claim 1, further including A substantially flat strainer panel integrally extending rearwardly from said upper sector rim toward said perpendicular axis, Means forming a pouring opening extending through said strainer panel adjacent to said shallow central spout, whereby the upper surface of liquid contained in said container vessel is beneath and substantially parallel to said upper plane when said vessel is in its normal upright storage position, and whereby said upper liquid surface wells upward through said opening and pours over said shallow central spout when said perpendicular axis of said container vessel is tilted toward said central spout through a pouring angle.

5. The molded elastomer pour spout device defined in claim 4, further including a plurality of additional holes, smaller in diameter than said pouring opening, all extending through said strainer panel and dimensioned to retain any objects floating in said liquid from passing through said holes when said container vessel is tilted through a pouring angle.

6. The molded elastomer pour spout device defined in claim 4, wherein the strainer panel extends over a portion of the contained liquid's upper surface which constitutes a minor portion of the total upper surface of the contained liquid in said container vessel.

7. The molded elastomer pour spout device defined in claim 4, wherein said substantially flat strainer panel is mildly dished in a concave shape, whereby liquid welling upward through said opening is directed toward said shallow central spout.

8. The molded elastomer pour spout device defined in claim 4, further including two raised front ridges extending upward along the junction of the strainer panel and the front flange panel, interrupted only by said shallow central spout.

9. The molded elastomer pour spout device defined in claim 8, further including a shallow groove formed in the strainer panel adjacent to the raised front ridges, directing liquid upwelling through said opening toward said shallow central spout.

* * * * *